(12) United States Patent
Morales

(10) Patent No.: US 11,797,805 B1
(45) Date of Patent: Oct. 24, 2023

(54) METHODS AND PRINTING SYSTEM USING CLASSIFICATION-BASED CONSUMABLE USE IN PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/825,888

(22) Filed: May 26, 2022

(51) Int. Cl.
 *G06F 3/12* (2006.01)
 *G06K 15/02* (2006.01)

(52) U.S. Cl.
 CPC ....... *G06K 15/1823* (2013.01); *G06F 3/1203* (2013.01); *G06F 3/1229* (2013.01)

(58) Field of Classification Search
 None
 See application file for complete search history.

(56) References Cited

U.S. PATENT DOCUMENTS

| | | | | |
|---|---|---|---|---|
| 2009/0016748 A1* | 1/2009 | Ferlitsch | ................ | G03G 21/02 399/39 |
| 2010/0053673 A1* | 3/2010 | Oba | ....................... | G03G 21/02 358/1.15 |
| 2010/0153145 A1* | 6/2010 | Klassen | ............. | G03G 15/5016 707/E17.023 |
| 2014/0233055 A1* | 8/2014 | Eizenberg | ............. | G06F 3/1244 358/1.15 |
| 2015/0054881 A1* | 2/2015 | Tanaka | ..................... | B41J 29/38 347/19 |
| 2019/0079708 A1* | 3/2019 | Yamada | ................ | G06F 3/1263 |
| 2019/0268482 A1* | 8/2019 | Stanich | ............. | H04N 1/00005 |
| 2022/0137903 A1* | 5/2022 | Morales | ................ | G06F 3/1219 358/1.2 |
| 2022/0391649 A1* | 12/2022 | Worrall | ............. | G06K 15/1823 |

* cited by examiner

Primary Examiner — Henok Shiferaw
(74) *Attorney, Agent, or Firm* — MILLEN, WHITE, ZELANO & BRANIGAN, P.C.; William Nixon

(57) ABSTRACT

An estimation system provides consumable use estimations, such as for ink or toner, in printing operations. The estimation system uses a classification-based consumable use process to estimate the consumable use. A print job is assigned a classification category according to an arbitrary job category selected for the print job and a job property defined for the print job using job settings. A plurality of classification categories are available. Job costing data for the print job is provided and used to determine consumable use values for each sheet in the print job and a total consumable use. This information is used to verify the correct classification category was assigned and to update historical consumable use information. An estimate is provided using the classification category and the distribution of the consumable use for print jobs in the category.

20 Claims, 12 Drawing Sheets

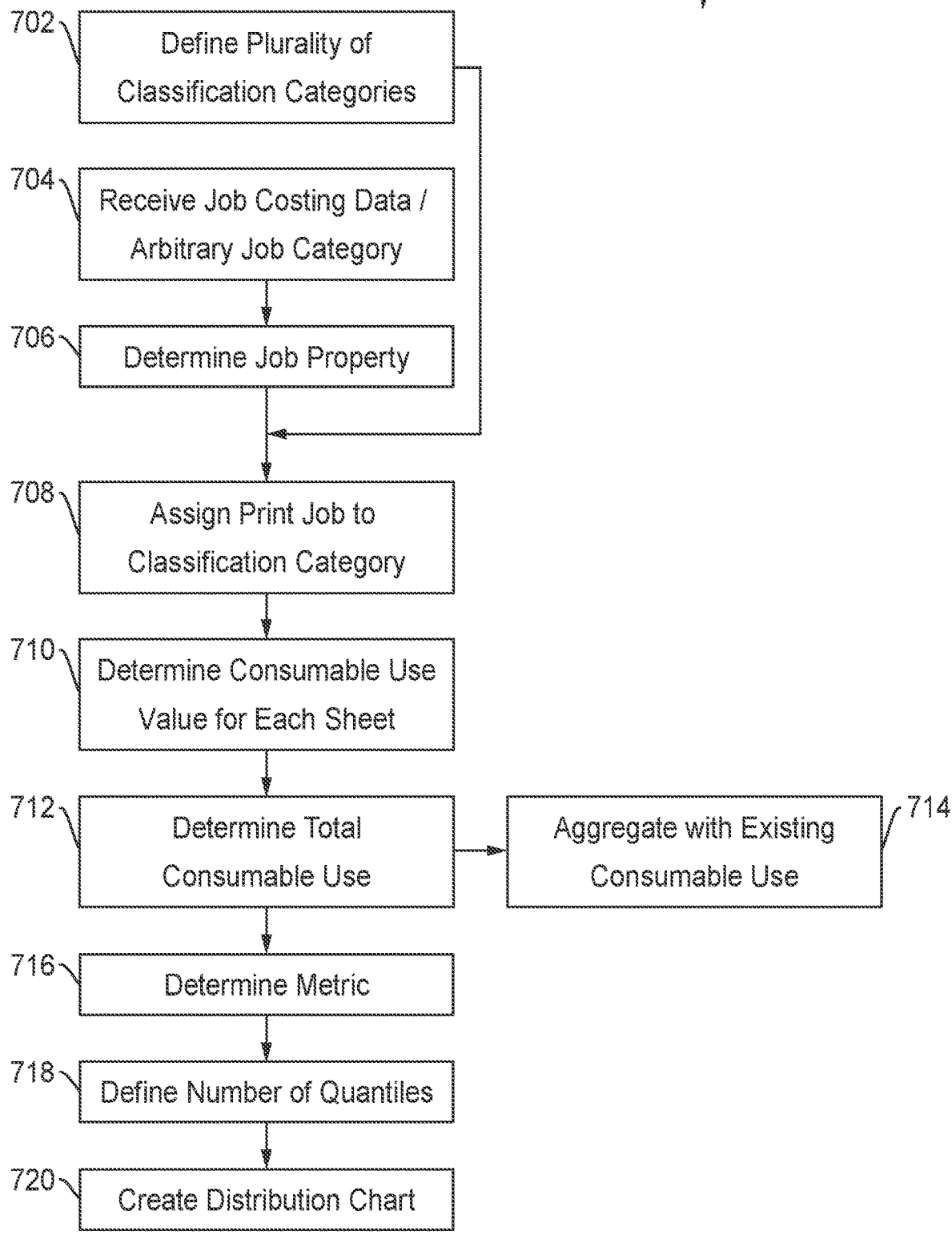

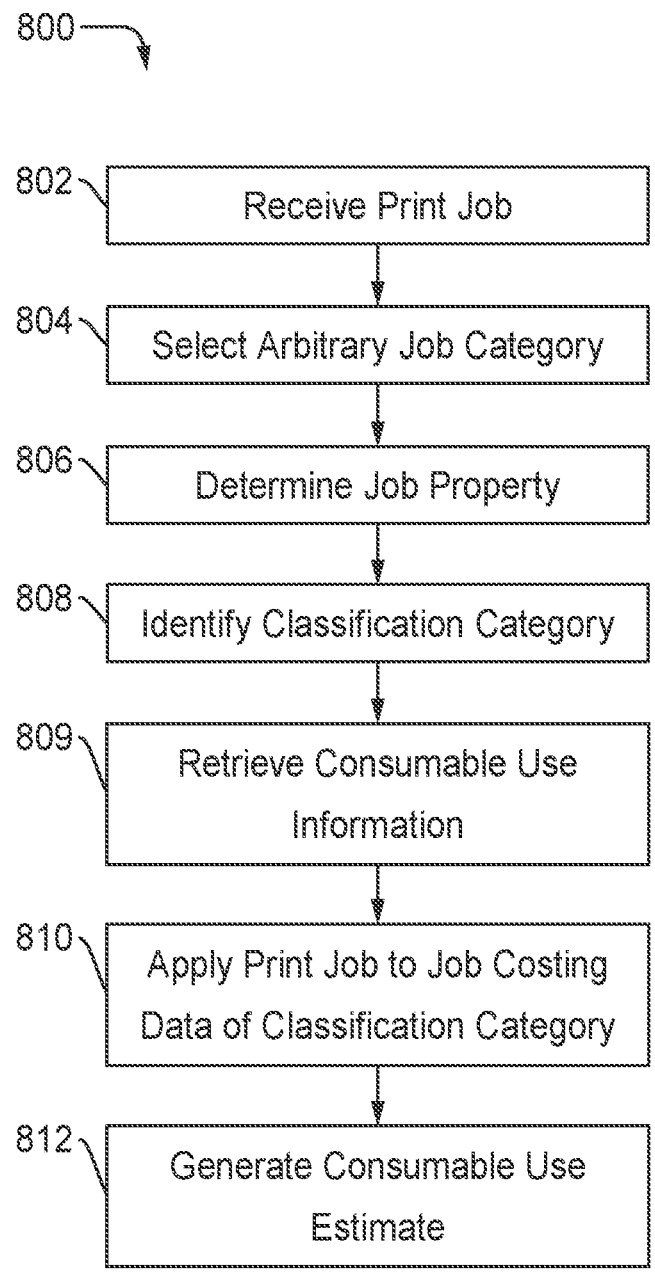

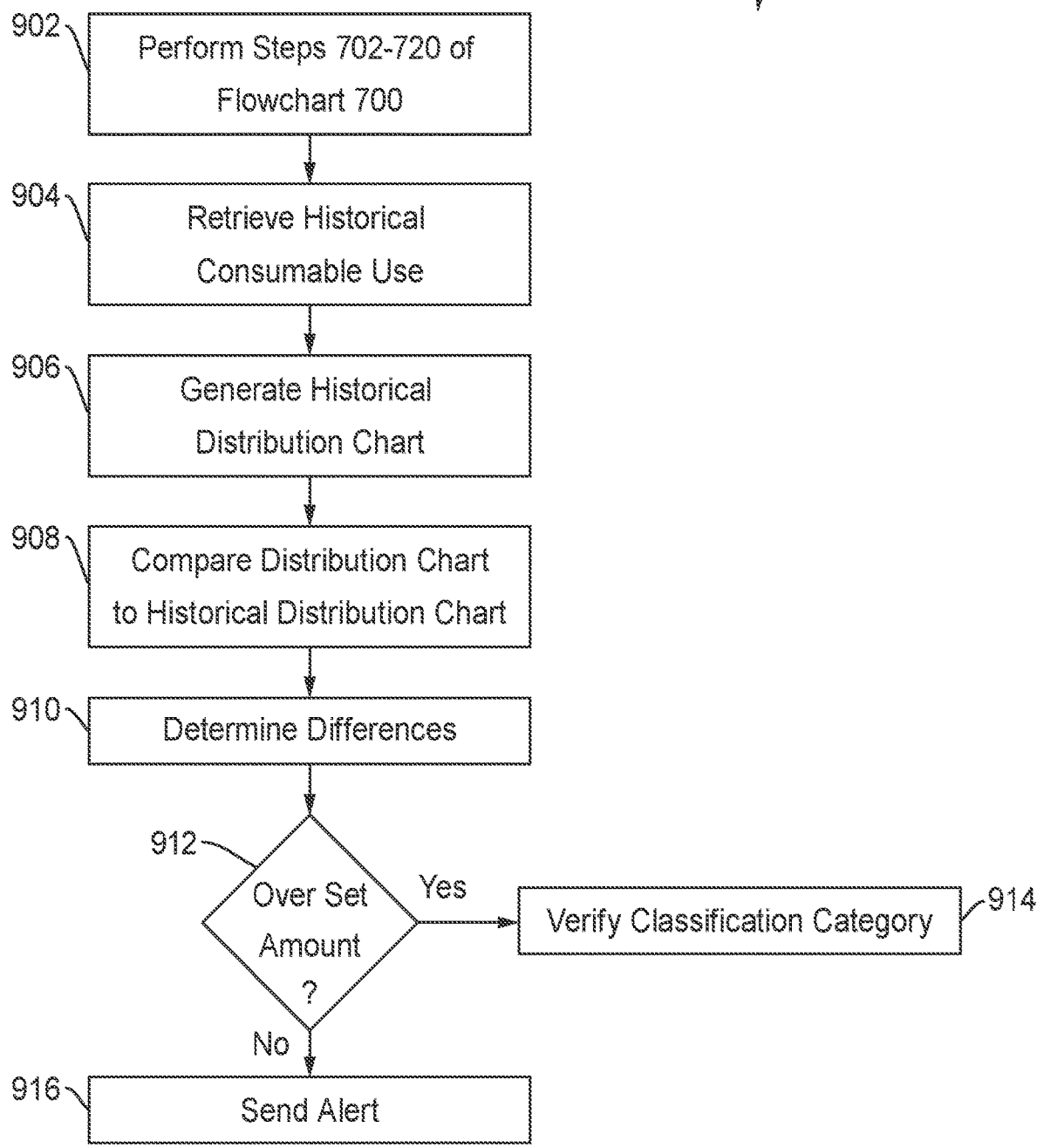

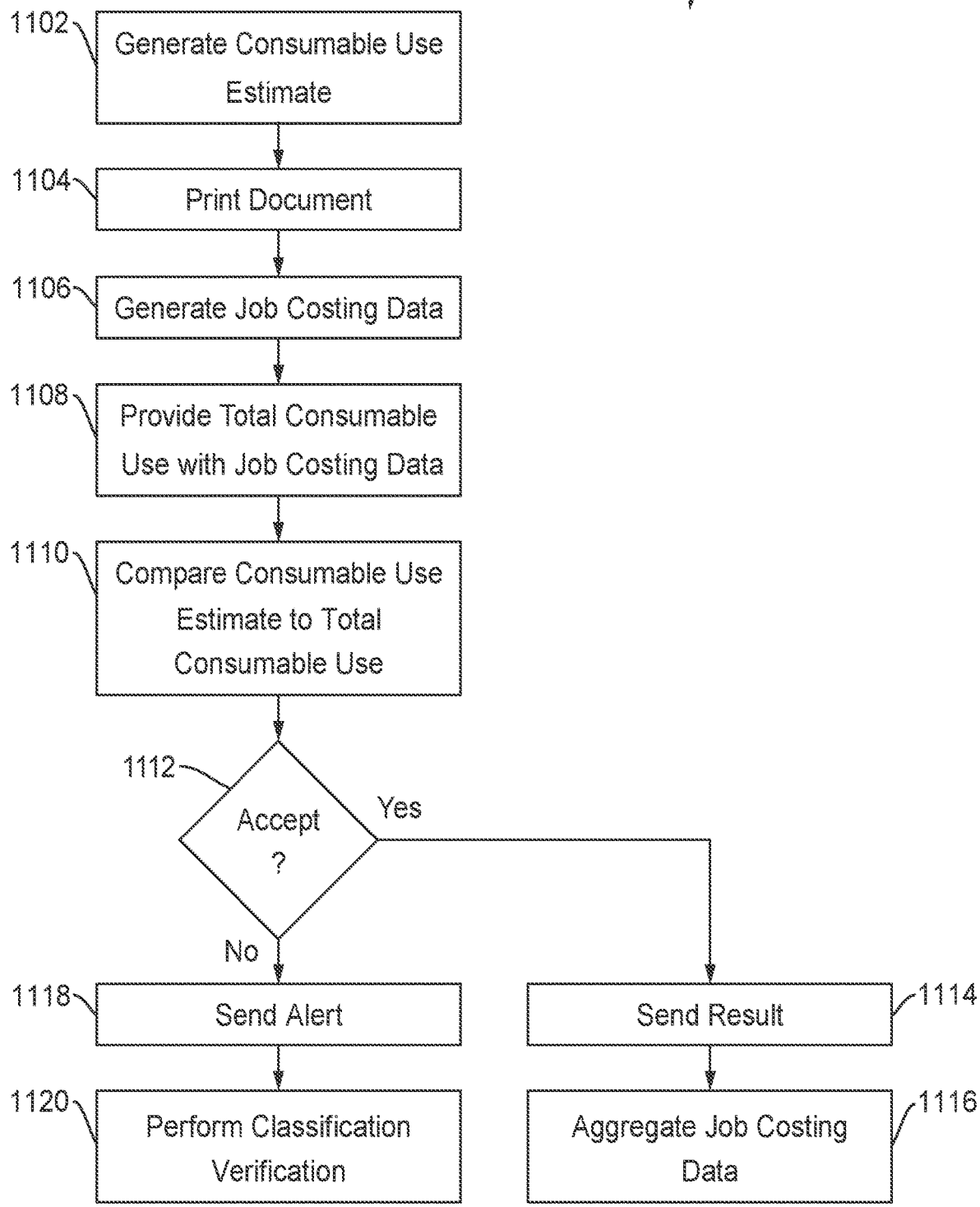

METHODS AND PRINTING SYSTEM USING CLASSIFICATION-BASED CONSUMABLE USE IN PRINTING OPERATIONS

FIELD OF THE INVENTION

The present invention relates to a printing system and associated methods to estimate consumable use in printing operations. More particularly, the present invention uses classification-based consumable use to categorize and track print jobs.

DESCRIPTION OF THE RELATED ART

A reason provided by print shops for not estimating consumable use, such as ink and toner usage, is that they do not receive the print job in time for estimation operations. For print shops like transactional or book printers, this issue may not be a problem as they use a limited set of papers and also that print job usually have similar coverage. For print shops that use a large variety of papers or process many different kinds of jobs, this issue may be important. Print shops may estimate the costs for print jobs by classifying print jobs based on their likely ink use. Pricing is done based on these classifications. This process may work reasonably well but it is predicated on proper classification and requires operators to perform periodic validation in order to ensure that the print shop is pricing jobs properly.

SUMMARY OF THE INVENTION

A method for using classification-based consumable use data in printing operations is disclosed. The method includes defining a plurality of classification categories. Each classification category includes an arbitrary job category and a job property. The method also includes receiving job costing data for a print job processed at a printing device at an estimation system. The method also includes assigning the print job to a classification category of the plurality of classification categories based on a job setting corresponding to the job property. The method also includes determining a consumable use value for each sheet within the print job. The method also includes determining a total consumable use according to the consumable use values and a total number of pages for the print job. The method also includes aggregating the total consumable use for the print job with existing consumable use information for the classification category.

A method for using classification-based consumable use data for printing operations is disclosed. The method includes receiving job costing data for a print job processed at a printing device at a consumable use estimation system. The method also includes assigning the print job to a classification category based on an arbitrary job category received with the print job and a job property of the print job. The arbitrary job category is a user input. The method also includes determining a consumable use value for each sheet within the print job. The method also includes determining a total consumable use according to the consumable use values and a total number of pages for the print job. The method also includes verifying that the print job is classified correctly according to the consumable use values for the sheets using a distribution for the classification category.

An estimation system for a printing system is disclosed. The estimation system includes a processor and a memory. The memory includes instructions to configure the processor to define a plurality of classification categories. Each classification category includes an arbitrary job category and a job property. The processor also is configured to receive job costing data for a print job processed at a printing device at the estimation system. The processor further is configured to assign the print job to a classification category of the plurality of classification categories based on the arbitrary job category and the job property. The processor also is configured to determine a consumable use value for each sheet within the print job. The processor also is configured to determine a total consumable use according to the consumable use values and a total number of pages for the print job. The processor also is configured to aggregate the consumable use values and the total consumable use for the print job with existing consumable use information for the classification category.

A method for classification-based consumable use estimation is disclosed. The method includes receiving a print job at an estimation system. The estimation system provides a consumable use estimate for the print job. The print job includes at least one job setting. The method also includes identifying a classification category from a plurality of classification categories for the print job based on an arbitrary job category and a job property defined from the at least one job setting. The arbitrary job category is selected by an operator input. The method also includes retrieving consumable use information for the classification category. The method also includes estimating the consumable use estimate for the print job by applying a property for the print job to the consumable use information.

A method for verifying a consumable use estimate for a print job is disclosed. The method includes receiving a print job at an estimation system. The estimation system provides a consumable use estimate for the print job. The print job includes at least one job setting. The method also includes identifying a classification category from a plurality of classification categories for the print job based on an arbitrary job category and job property defined from the at least one job setting. The arbitrary job category is selected by an operator input. The method also includes estimating the consumable use estimate based on the classification category. The method also includes printing a document for the print job. The method also includes generating job costing data for printing the document. The job costing data includes a consumable use. The method also includes verifying the consumable use estimate according to the consumable use at the estimation system.

An estimation system for a printing system is disclosed. The estimation system includes a processor and a memory. The memory includes instructions to configure the processor to receive a print job at the estimation system. The estimation system provides a consumable use estimate for the print job. The instructions also configure the processor to identify a classification category from a plurality of classification categories for the print job based on an arbitrary job category and a job property defined from the at least one job setting. The arbitrary job category is selected by an operator input. The instructions also configure the processor to retrieve consumable use information for the classification category. The instructions also configure the processor to estimate the consumable use estimate for the print job by applying a property for the print job to the consumable use information.

BRIEF DESCRIPTION OF THE DRAWINGS

Various other features and attendant advantages of the present invention will be more fully appreciated when considered in conjunction with the accompanying drawings.

FIG. 7 illustrates a flowchart for using classification-based consumable use data in printing operations according to the disclosed embodiments.

FIG. 8 illustrates a flowchart for performing classification-based consumable use estimation according to the disclosed embodiments.

FIG. 9 illustrates a flowchart for verifying a classification category for a print job according to the disclosed embodiments.

FIG. 11 illustrates a flowchart for verifying the consumable use estimate for the print job using the estimation system according to the disclosed embodiments.

DETAILED DESCRIPTION OF THE PREFERRED EMBODIMENTS

Figure 1A:
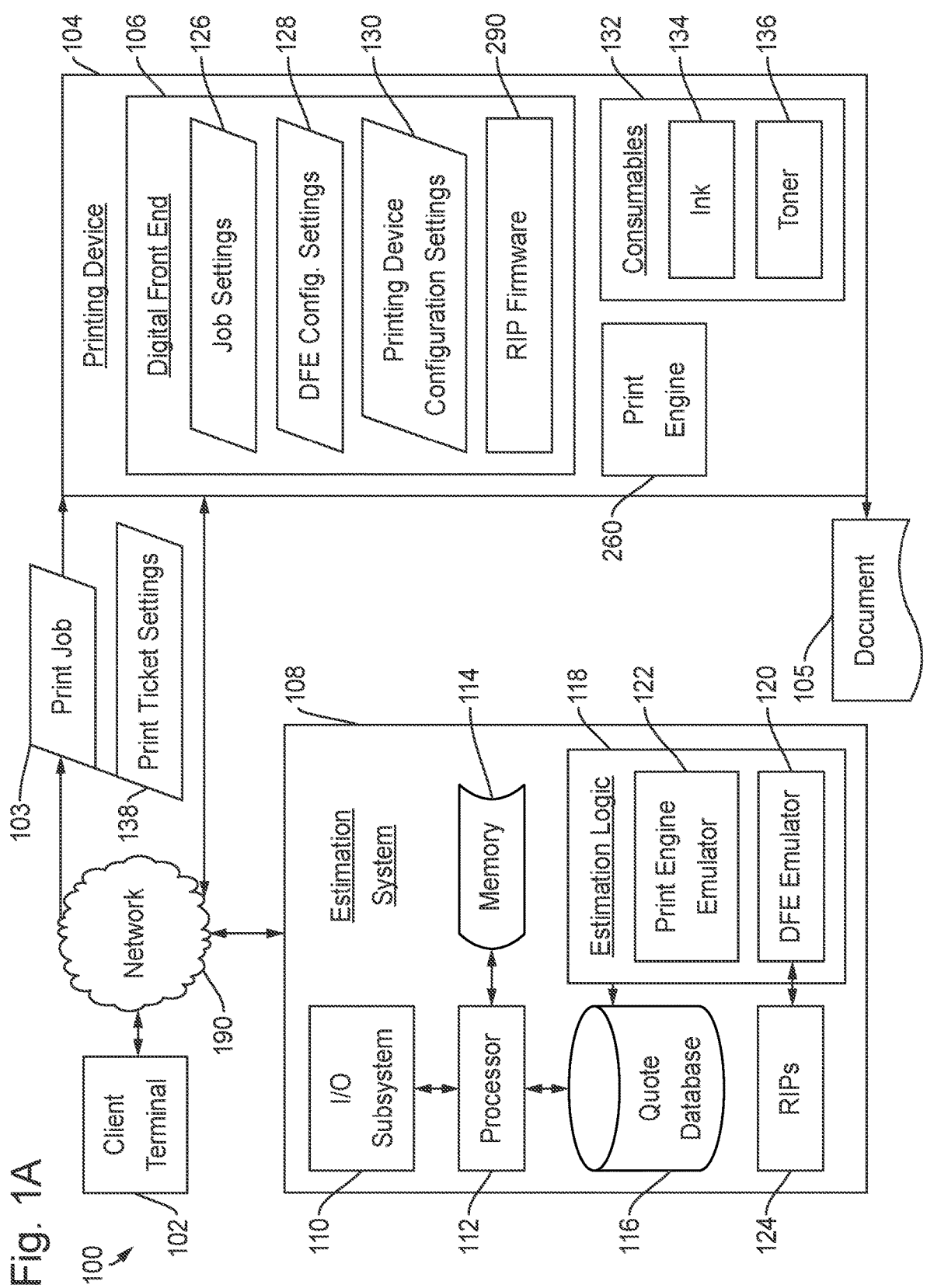
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a classification-based consumable use estimation system. When a print job is submitted to a printing device, the user may specify a job category with which the print job should be associated. The printing device raster image processes and prints a document for the print job as normal. After the document is printed, the digital front end (DFE) of the printing device sends job costing data to an estimation system.

The estimation system looks at the job costing data. It also assigns the print job to one of a plurality of classification categories. The classification categories are based on both the user-entered category and on a job property associated with the print job itself. Job properties includes paper type, such as plain, coated, inkjet, and the like, paper color, paper size, color mode, such as color versus monochrome, and the like. Once the print job is classified to a classification category, the estimation system determines the consumable use per page for the print job. It aggregates that information with existing consumable use information.

The estimation system may report consumable use for all unique property combinations within a specific category. The estimation system also may report the following metrics to the operator: average, media, or geometric mean consumable use per page, and per page consumable use distribution. It also may report per sheet consumable use per quantile. The operator will have the option to define the number of quantiles, such as quintiles to divide data into 5 bands. This information is used by the print shop to define assumptions about consumable use for different job classifications, which then may be used to quote consumable use for print jobs.

In addition to aggregating information to provide assumptions that the print shop may use for job quoting, the estimation system also may verify that print job were categorized properly. The estimation system may allow the operator to view how the consumable use for the classifications compare to each other. When viewing consumable use information for classifications, the operator will have the ability to include or exclude values for individual properties. The classifications are meant to cover different ranges of consumable use. For example, if a chart for a specific color mode and paper type and color looks like a chart showing a distribution, then the print shop will know there is a problem with the classifications as they are currently defined.

The estimation system also may perform ongoing verification by adding data for all print jobs to the estimation system. The estimation system may warn the print shop if aggregate metrics for the classification drift by more than a set amount, which may be configurable by the operator. The estimation system also may provide feedback on user categorization of print jobs.

When job costing data is received for a print job, the estimation system may determine where in the distribution for the classification the print job falls. The estimation system may alert the operator that a print job was potentially misclassified if the print job falls outside of the distribution for a specific classification. The estimation system also may alert the operator if the print job is within a certain threshold of the edges of the current distribution. The estimation system may provide the operator with the option to exclude the print job from the classification. Alternatively, the estimation system may provide the operator the option to assign the print job to another classification.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client terminals 102.

Printing device 104 receives print jobs through printing system 100, such as print job 103. After processing print job 103, printing device 104 prints or produces document 105 in a paper or media specified by the print job. Printing device 104 is disclosed in greater detail in FIG. 2. Printing device 104 also includes digital front end (DFE) 106, which facilitates processing print job 103. DFE 106 may be disclosed in greater detail in FIG. 1B. In addition to the components of DFE 106 disclosed in FIG. 1B, it also includes various settings that may be of use for ink use estimation. This information includes job settings 126, DFE configuration settings 128, and printing device configuration settings 130. DFE 106 also includes RIP firmware 290, disclosed in greater detail below.

Printing device 104 also includes consumables 132. Consumables 132 may relate to items at or within printing device 104 but are not actually part of the printing device itself. Consumables 132, however, are used in printing operations. Consumables 132 include ink 134 and toner 136. Ink 134 and toner 136 further may be broken into different colorant inks. For example, ink 134 may include cyan ink, magenta ink, yellow ink, and black ink. If printing device 104 is not capable of color printing, then ink 134 may include only black ink. Printing device 104 may include other consumables 132, such as sheets, that are not disclosed in detail herein.

Print job 103, when printed on printing device 104, uses an amount of consumables 132 to produce document 105. In some embodiments, print job 103 produces thousands or more of a document. Thus, the amount of consumables used for print job 103 may be considerable. As disclosed above, printing system 100 may need to provide an estimate for the use of consumable 132. The estimate determined for print job 103 may depend on various settings of printing device 104. The settings as well as print ticket settings 138 associated with print job 103 impact the amount of consumables 132 used to generate document 105.

For example, DFE 106 may use RIP firmware 290 to convert bitmap images, vector graphics, fonts, and the like associated with pages in print job 103 to bitmap/rasterized representations of the pages, such as C, M, Y, and K pixels. The sum of the values of pixels of a particular color in the rasterized pages can be proportional to the amount of consumables 132 used by printing device 104 to print that color. RIP firmware 290 may rasterize pages of print job 103 according to various image rasterization settings, as captured by DFE configuration settings 128. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters, shown as printing device configuration settings 130, that can control the operation of printing device 104, which impacts the amount of consumables 132 required by the printing device. For example, these settings may include printing device maintenance settings that control or effect head cleaning intervals, head clogging prevention intervals, and the like of printing device 104. Printing device configuration settings 130 also may include spitting, or printing spray pattern over all content, the printing of purge sheets, the printing of spit lines, or lines printed between page frames in a roll-fed printing device to ensure that all jets of the print head fire when instructed.

To lower printing device consumable usage, RIP firmware 290 may be configured via image rasterization parameters of DFE configuration settings 128 to reduce the density for each colorant, convert color images to black and white, and adjust tone reproduction curves (TRCs) to lower printing device use of consumables 132. Gray component replacement levels may be adjusted via DFE configuration settings 128.

The disclosed embodiments also include an estimation system 108 that includes estimation logic to facilitate performance of ink use estimation. Estimation system 108 may include estimation logic 118 having a DFE emulator 120 and a print engine emulator 122 configured to emulate operations performed by DFE 106 and print engine 260 of printing device 104. Print engine 260 is disclosed in greater detail below. DFE, emulator 120 and print engine emulator 122 may be configured with job settings 126, DFE configuration settings 128, and printing device configuration settings 130 to match settings associated with printing device 104. Estimation logic 118 also may be configured to estimate the amount of consumables 132 to process print job 103 and produce document 105.

In operation, estimation logic 118 may monitor information and settings of printing device 104 to determine any differences from previous estimates. This feature facilitates real-time configuration information for DFE 106, RIP firmware 290, or print engine 260 with the corresponding settings utilized by printing device 104.

Estimation system 108 may be any device within system 100 and connected to network 190 to receive and send data to printing device 104. Estimation system 108 also may be connected to other printing devices within system 100. Preferably, estimation system 108 is a server. It also may be another device, such as a computer. Estimation system 108 includes a memory 114 and a processor 112. Estimation system 108 also includes an input/output (I/O) subsystem 110 and a quote database 116.

Estimation system 108 also may refer to consumable estimation software that executes on a device. As disclosed below, "offline estimation device" may refer to this software. The term "offline" may refer to the fact that estimation system 108 is not part of printing device 104, or an "inline" component of the printing process.

Processor 112 is in communication with memory 114. Processor 112 is configured to execute instruction code in memory 114. The instruction code controls offline estimation device 108 to perform various operations for estimating consumables 132 that may be used by printing device 104. Processor 112 may be a computer processing unit that executes the instruction code in memory 114.

I/O subsystem 110 may include one or more input, output, or input/output interfaces that are configured to facilitate communications with other devices within system 100, such as client terminal 102 and printing device 104. An example of I/O subsystem 110 may be configured to dynamically determine the communication methodology utilized by entities of system 100 to communication information thereto. For example, I/O subsystem 110 may determine that a first entity utilizes a RESTful API and can, as a result, communicate with the entity using an interface that uses a RESTful communication methodology.

Estimation logic 118 is implemented within offline estimation device 108 to estimate the amount of consumables 132 to be used by printing device 104 for printing document 105 of print job 103. Estimation logic 118 includes DFE emulator 120 and print engine emulator 122, as disclosed above. DFE emulator 120 and print engine emulator 122 are configured with configuration setting information to match the settings and parameters of printing device 104.

DFE emulator 120 may be configured to emulate operations performed by DFE 106 of printing device 104. The emulation depends on various settings specified for printing device 104. For example, DFE emulator 120 may be configured to convert bitmap images, vector graphics, fonts, and the like specified in sample pages of print job 103 to bitmap/rasterized representations of the pages using C, M, Y, and K pixels. The manner in which DFE emulator 120 performs the conversion may depend on various image rasterization settings of the DFE emulator, which correspond to the image rasterization settings of DFE 106.

In some embodiments, DFE emulator 120 retrieves a RIP of the plurality of RIPs 124 available at estimation system 108. Selection of the appropriate RIP provides a better basis to estimate ink use. For example, estimation logic 118 may determine the DFE, software version for DFE, 106 to select a RIP that has the same version. Estimation system 108 includes many different RIPs 124. Preferably, it includes one for each software version that has been released. DFE emulator 120 may automatically configure the selected RIP using configuration settings from information retrieved from DFE 106.

Print engine emulator 122 may be configured to emulate operations performed by print engine 260 or printing device 104. The emulation may depend on various printing device configuration settings 130 for printing device 104.

Estimates provided using estimation logic 118 of estimation system 108 may be stored as a record or entry in quote database 116. Each entry to quote database 116 may specify aspects associated with an estimate provided to a customer for processing a particular print job 103. Each entry may include field for job settings 126, DFE configuration settings 128, and printing device configuration settings 130 used to provide the estimate as well as a consumables estimate field and a cost field. Other information may be provided such as a client information field, a job information field, or a unique identification (ID) field. Preferably, print job 103 is a recurring printing operation in that multiple instances will occur that involves the printing of document 105.

Figure 1B:
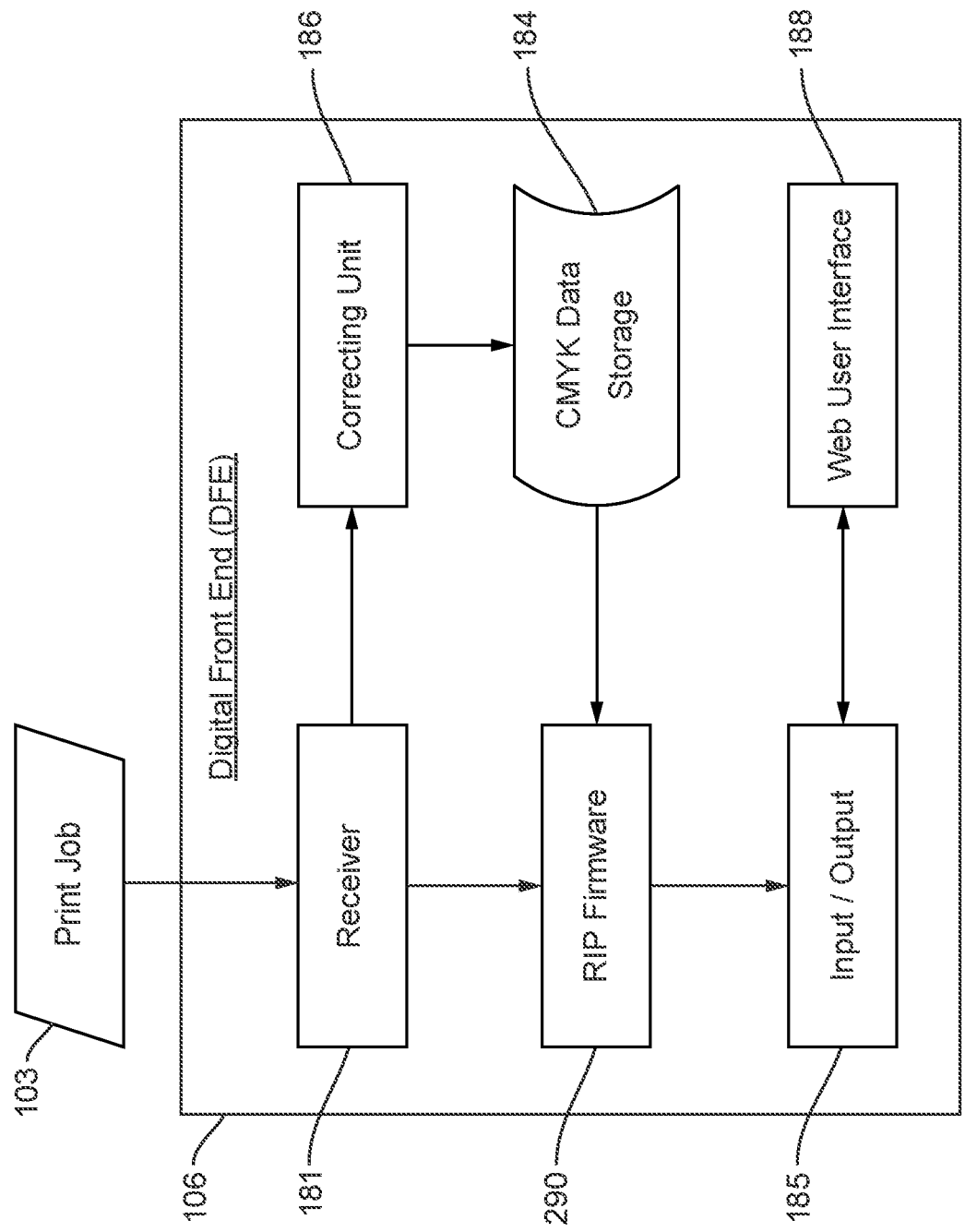
FIG. 1B illustrates a digital front end (DFE) for a printing device according to the disclosed embodiments.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A. DFE 106, therefore, includes data for job settings 126, DFE configuration settings 128, and, optionally, printing device configuration settings 130, even though these are not shown in FIG. 1B.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or estimation system 108, if it is located at a separate device, using, for example, input/output connector 185. Web user interface 188, or web application, allows a user of the DFEs of other printing devices to interact with content or software running on DFE 106.

Figure 2:
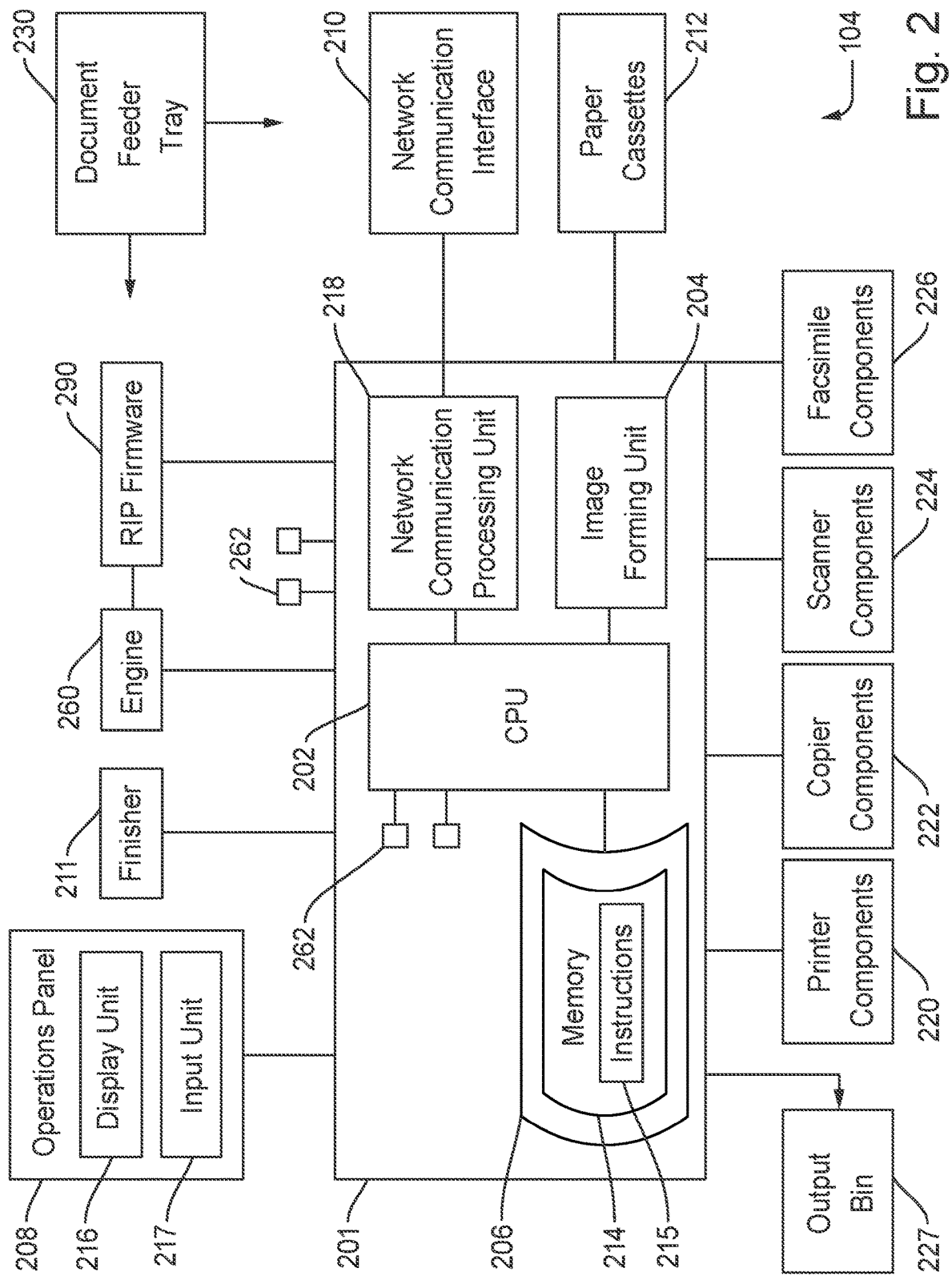
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from estimation system 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from offline estimation device 108, if applicable. Estimation system 108 may send ink use estimation data to printing device 104 for display. For example, the operator at printing device 104 may request an estimate for a received print job 103. Printing device 104 requests an estimate for consumables 132 according to the disclosed embodiments.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from estimation system 108 as well as other printing devices within system 100.

Figure 3:
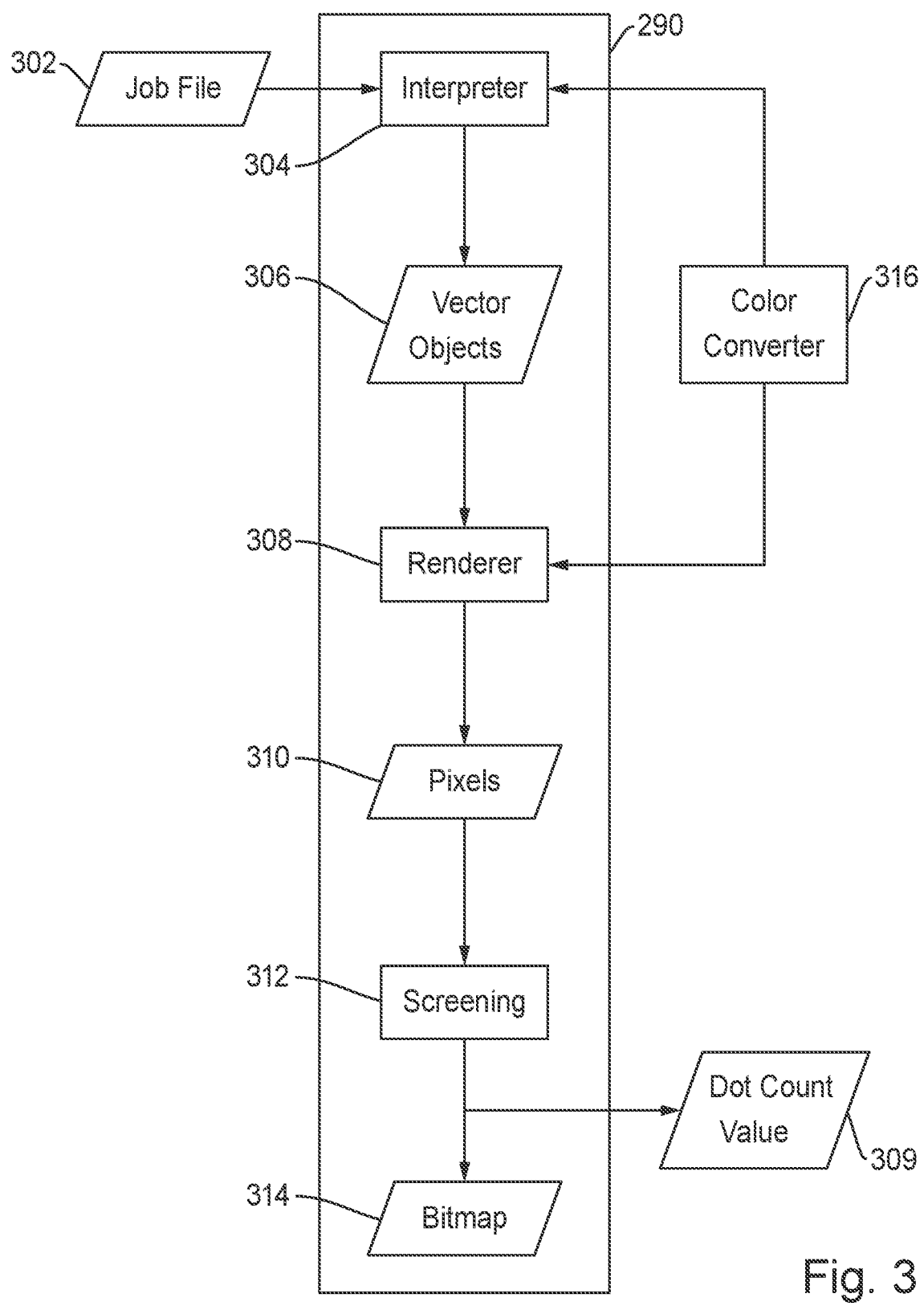
FIG. 3 illustrates a block diagram of RIP firmware used within the DFE according to the disclosed embodiments.

FIG. 3 depicts a block diagram of RIP firmware 290 used within DFE 106 according to the disclosed embodiments. RIP firmware 290 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP firmware 290 may provide interpretation, rasterization, and screening.

Job file 302 may be a job file associated with print job 103. Job file 302 may be a PostScript file in code. Job file 302 may be provided to RIP firmware 290 in DFE 106 to convert its code into raster or bitmap code. Job file 302 is received at interpreter 304, which interprets the commands in the code to redraw the object and elements of a page as vector objects 306. The PDL of job file 302 is read and decoded into graphical elements to be placed on a sheet. Each element may be an image, a character of text, a fill, stroke, and the like or listed in vector objects 306.

Renderer 308 processes vector objects 306 to convert every graphical element into the appropriate pattern of pixels to form the output raster. The resolution independent vector objects are converted into pixels 310. Screening 312 takes the raster image of pixels 310 to form individually screened cyan, magenta, yellow, and black separations. These are halftone dots in the form of a bitmap 314 consisting of commands that can be understood by print engine 260.

RIP firmware 290 also may implement color converter 316. Color converter 316 may implement the functions disclosed above with regard to color conversion. Color converter 316 provides color management and calibration. These actions may be applied during interpretation or rendering, depending on configuration and job content. Color printing resources may be accessed to provide the color management.

RIP firmware 290 may have a software version or other identification associated with it that distinguishes this version from others in system 100. Printing device 104 may implement several different RIP firmware versions depending on the type of print job 103. Further, different printing devices may implement different versions of the RIP firmware. Preferably, RIP firmware 290 is software implemented.

The disclosed embodiments also may determine dot count value 309 from the rendered image provided by renderer 308. Dot count values may be adjusted based on screening 312 and based on settings at printing device 104. Dot count value 309 may be reported to estimation system 108, as disclosed below.

The rendered document, or bitmap 314, may be sent to print engine 260. Estimation system 108 may apply a formula to dot count value 309 along with applicable settings to determine consumable use. Further, the disclosed embodiments may use this information to use a single consumable use estimate with a variety of job settings 126, DFE configuration settings 128, or printing device configuration settings 130. Dot count value 309 should not change once determined from the rendered document from RIP firmware 290. Engine specific settings, such as halftones, however, will impact consumable use at print engine 260, and may differ over time at printing device 104 or at another printing device within system 100.

Figure 4:
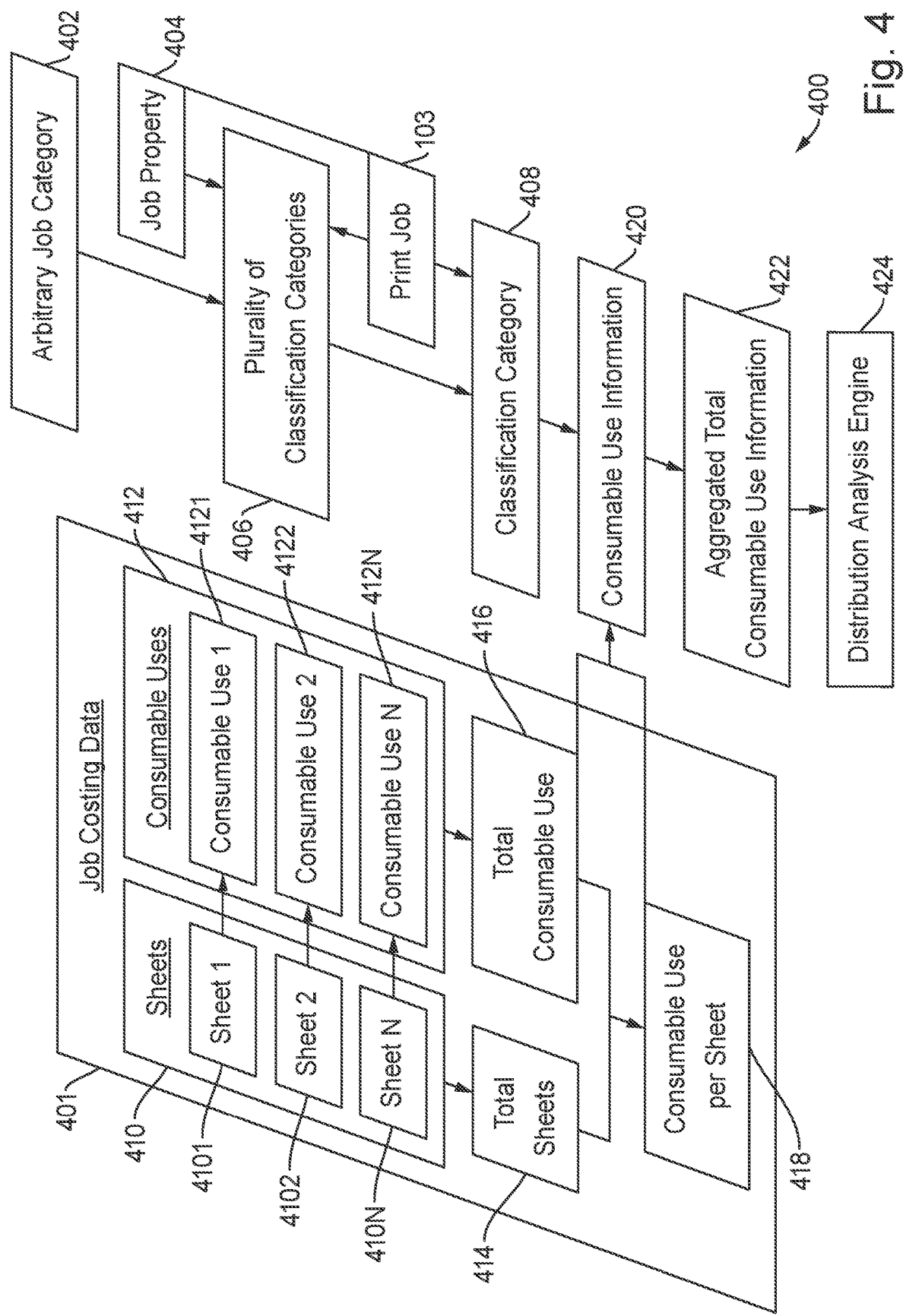
FIG. 4 illustrates a data flow for classification-based consumable use estimation in accordance with the disclosed embodiments.

FIG. 4 depicts a data flow 400 for classification-based consumable use estimation in accordance with the disclosed embodiments. Data flow 400 may occur in estimation system 108 while monitoring printing operations and receiving consumable use information from the connected printing devices. For example, printing device 104 may report data to estimation system 108 related to the amount of consumables 132 used in printing document 105. Estimation system 108 may use this information to determine if the consumable use corresponds with the determined classification category for print job 103.

When print job 103 is submitted to printing device 104, the operator may optionally specify an arbitrary job category 402 with which the print job should be associated. Several arbitrary job categories should be available to print at printing device 104. Examples of arbitrary job categories include high quality photograph books, trade books, marketing postcards, economy postcards, brochures, posters, and the like. Arbitrary job categories may relate to the different items that are printable at printing device 104. As print job 103 is associated with print ticket settings 138 that set forth job settings 126 and other information that defines how print job 103 is printed at printing device 104, arbitrary job category 402 may not influence how the print job is processed in any way.

Printing device 104 processes and prints print job 103 to generate document 105. DFE 106 may determine use of consumables 132 as well as the number of sheets used in document 105. DFE 106 sends this job costing information to estimation system 108. FIG. 4 may show job costing data 401, which is disclosed in greater detail below.

Estimation system 108 looks at job costing data 401 and classifies print job 103 into a classification category. The classification is based on arbitrary job category 402, preferably entered by the operator and on job property 404. Job property 404 may be determined one or a plurality of job settings 126. Examples of job property 404 may be paper type (such as plain, coated, inkjet, and the like), paper color, paper size, color mode (monochrome vs. color), and the like. For example, job settings 126 may define what type of paper to use for print job 103. From the job settings, estimation system 108 determines that job property 404 is that paper type, such as coated. Job properties are not arbitrary or assigned by the operator but relate to print job 103 through its job settings 126. Instead, they relate to the actual settings used to complete print job 103.

A classification is a combination of arbitrary job category 402, as defined by the operator, and unique values for selected job properties, such as paper type. Preferably, estimation system 108 will have a plurality of classification categories 406. For example, plurality of classification categories 406 may include the arbitrary job categories listed above and job properties of paper types. Thus, classification categories may include:

| | | |
|---|---|---|
| Photo Books/Plain Paper | Photo Books/Coated Paper | Photo Books/Inkjet Paper |
| Trade Books/Plain Paper | Trade Books/Coated Paper | Trade Books/Inkjet Paper |
| Postcards/Plain Paper | Postcards/Coated Paper | Postcards/Inkjet Paper |
| Brochures/Plain Paper | Brochures/Coated Paper | Brochures/Inkjet Paper |

These classification categories may be further broken down using additional job properties. For example, each classification category listed above may be split into monochrome and color print jobs. Alternatively, each classification category may be further split into page sizes. Thus, along with arbitrary job category 402, the disclosed embodiments may account for three job properties in classifying print job 103: paper type, paper size, and color printing.

Estimation system 108 receives arbitrary job category 402 and derives job property 404 from job settings 126. It then assigns print job 103 to one of plurality of classification categories 406, or classification category 408. Using the classification categories disclosed above, plain paper/coated may be identified by estimation system 108 as classification category 408.

Once print job 103 is classified, estimation system 108 determines the consumable use per page for the job. One way to do this is by looking at consumable use for each sheet in document 105. For example, referring to job costing data 401, document 105 may be broken down per to one or more sheets 410, such as sheet 1 4101, sheet 2 4102 to sheet N 410N. For each sheet, a consumable use 412 is determined. Thus, consumable uses 412 may include consumable use 1 4121, consumable use 2 4122, to consumable use N 412N. Total sheets 414 is determined from job costing data 401 while total consumable use 416 is determined by compiling consumable uses 412, shown as 4121, 4122 to 412N.

Alternatively, the disclosed embodiments may receive total consumable use 416 from DFE 106 for print job 103 by compiling consumable uses 412. Using this value, the disclosed embodiments may divide total consumable use 416 by total sheets 414 to determine consumable use per sheet 418. Estimation system 108 takes total consumable use 416 and consumable use per sheet 418 and associates this data with consumable use information 420 deriving from classification category 408. Classification category 408 corresponds to consumable use information 420, which is existing consumable use information for other print jobs assigned to the respective classification category. Estimation system 108 aggregates total consumable use 416 or consumable use per sheet 418 with consumable use information 420 to generate aggregated total consumable use information 422.

Estimation system 108 reports consumable use for all unique property combinations within a specific category. It may report the following metrics to the operator: average, median, or geometric consumable use per page, per page ink use distribution, and per page consumable use quantile (the operator has the option to define the number of quantiles, such as quintiles to divide data into 5 bands). This information, plus the aggregated values for total consumable use 416 and consumable use per sheet 418, may be used to quote future print jobs. For example, aggregated consumable use information 422 for arbitrary job category 402, as selected by the customer, and job property 404 may be used to estimate the consumable use per page for such print jobs, or a total consumable use estimate based on the total number of sheets for the print job.

Using the per page consumable use distribution, distribution analysis engine 424 may verify that print jobs are categorized properly. Estimation system 108 may allow the operator to see how the consumable use for the classification categories compare to each other. When viewing consumable use information for classification category 408, the operator may have the ability to include or exclude values for individual job properties. Distribution analysis engine 424 may provide this information as well as verify that print job 103 corresponds to the correct classification category 408. Distribution analysis engine 424 may be part of estimation system 108.

Figure 5A:
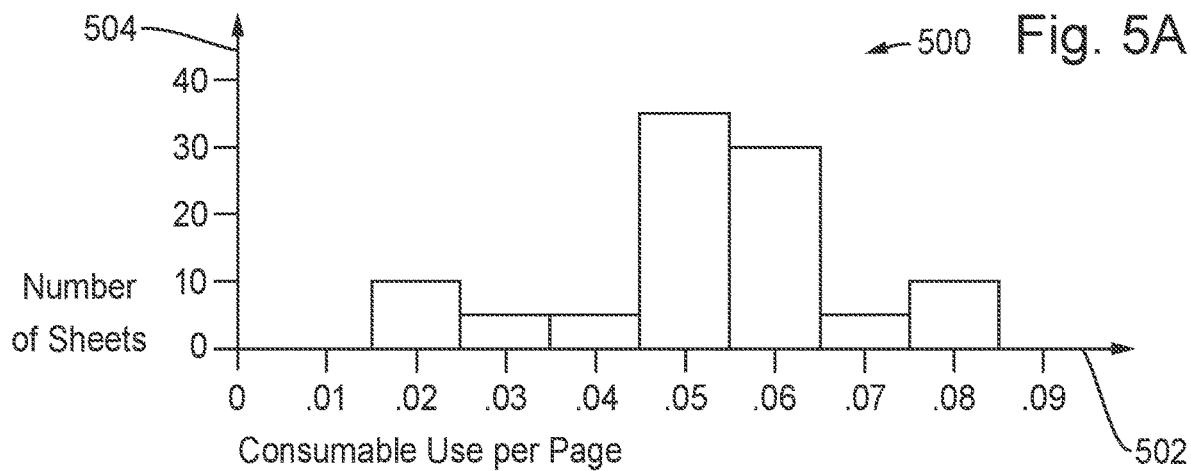
FIG. 5A illustrates a distribution chart for use in verifying a classification category for the print job according to the disclosed embodiments.
Figure 5B:
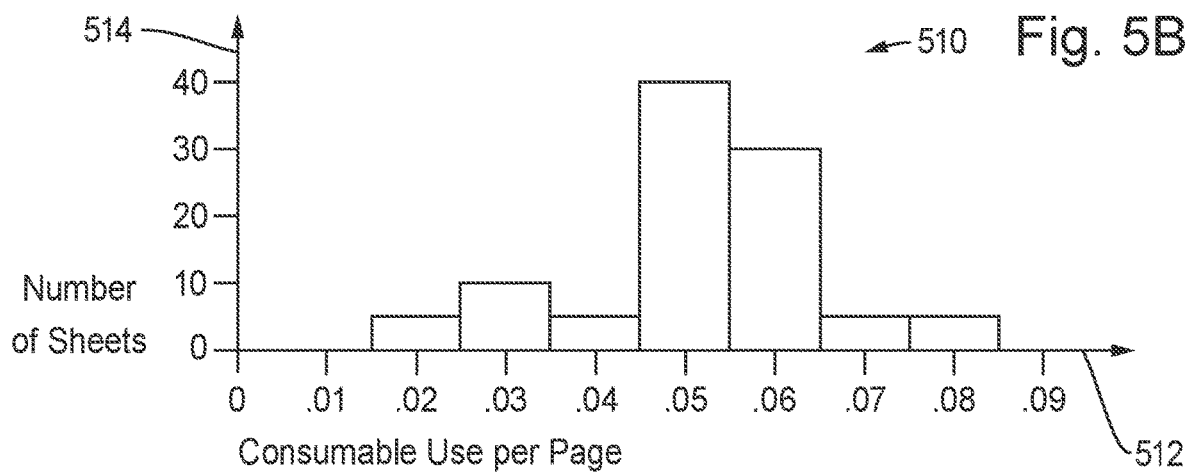
FIG. 5B illustrates another distribution chart for use in verifying the classification category for the print according to the disclosed embodiments.
Figure 5C:
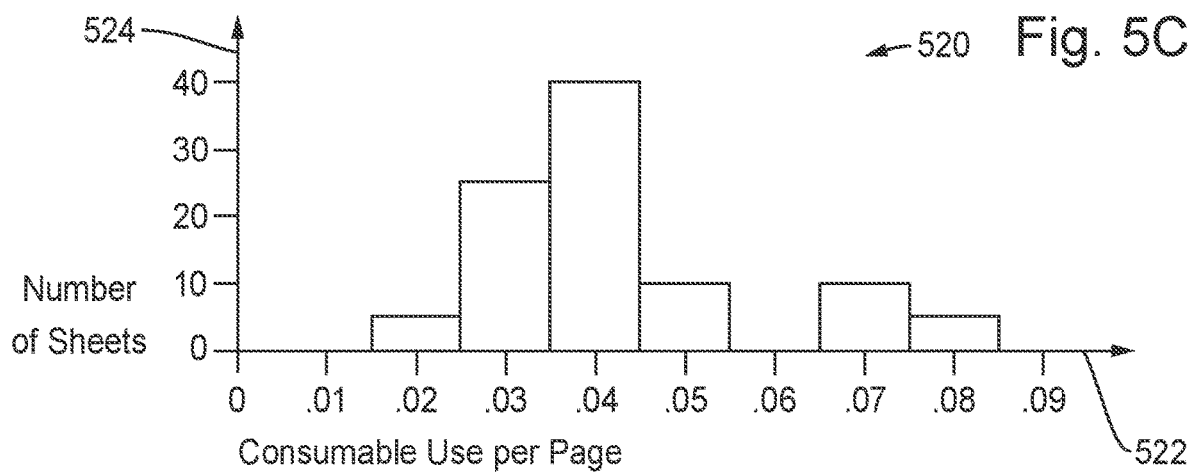
FIG. 5C illustrates another distribution chart for use in verifying the classification category for the print according to the disclosed embodiments.

FIGS. 5A, 5B, and 5C depict example distribution charts 500, 510, and 520, respectively, for use in verifying classification category 408 for print job 103 according to the disclosed embodiments. Distribution chart 500 may be for print job 103 after assigning classification category 408. Distribution charts 510 and 520 may be examples of historical distribution charts for the assigned classification category provided at estimation system 108. According to the disclosed embodiments, if classification category 408 is verified, then the results shown in distribution chart 510 or 520 may be updated with the results from distribution chart 500.

FIG. 5A depicts distribution chart 500 for how consumable use is distributed within print job 103. Using job costing data 401, estimation system 108 determines the consumable use per page. This data is plotted against the number of sheets that fall into a range for the consumable use. For example, print job 103 may include 100 pages, sheets, impressions, and the like. Distribution chart 500 shows the number of sheets on axis 504. These numbers are the total number of sheets that fall within the consumable use range shown on axis 502.

As disclosed above, the amount of consumable use may be determined for each sheet. In this example, consumables 132 may be ink 134. Thus, the amount of ink in picoliters (pL) may be determined for each sheet of print job 103. Thus, for distribution chart 500, 10 pages use between 0.015 and 0.025 pL of ink, 5 pages use between 0.026 and 0.035 pL of ink, 5 pages use between 0.036 and 0.045 pL of ink, 35 pages use between 0.046 and 0.055 pL of ink, 30 pages use between 0.056 and 0.065 pL of ink, 5 pages use between 0.066 and 0.075 pL of ink, and 10 pages use between 0.076 and 0.085 pL of ink.

The ranges for ink use may vary as amounts increase between classification categories. Further, in the given example, print job 103 includes 100 pages. As can be appreciated, print jobs may include any number of pages. For example, print job 103 may include 100,000 pages, with axis 504 adjusted accordingly. As shown in FIG. 5A, 65% of the pages of print job 103 use between 0.046 and 0.065 pL of ink.

FIG. 5B depicts distribution chart 510 for the historical job costing data for classification category 408 according to the disclosed embodiments. Distribution chart 510 may be based on consumable use information 410 provided by estimation system 108 for the selected classification category 408. For example, estimation system 108 may determine that classification category 408 for print job 103 is postcard/coated. Distribution chart 510 is the compiled results of job costing data 401 generated for previous print jobs in that classification category. For example, twenty (20) print jobs with 100 sheets have provided job costing data for consumable use. Distribution chart 510 shows the average consumable use distribution for those print jobs.

Axis 512 shows the consumable use per page while axis 514 shows the number of sheets of the print jobs that fall within the range on axis 512. In other words, print jobs for postcard/coated documents will usually have the distribution shown in distribution chart 510. As shown, 5 pages use 0.015 to 0.025 pL of ink, 10 pages use 0.026 to 0.035 pL of ink, 5 pages use 0.036 to 0.045 pL of ink, 40 pages use 0.046 to 0.055 pL of ink, 30 pages use 0.056 to 0.065 pL of ink, 5 pages use 0.066 to 0.075 pL of ink, and 5 pages use 0.076 to 0.085 pL of ink. The distribution of ink use shown by distribution chart 510 may differ from that of distribution chart 500 for print job 103. The disclosed embodiments may analyze these differences to verify that print job 103 is classified properly.

In some embodiments, the number of sheets for axis 514 may be replaced by a percentage of sheets used within the print jobs. For example, 40% of the sheets used in a print job for classification category 408 of postcard/coated should use between 0.046 to 0.055 pL of ink. This feature may be more accurate than the number of sheets in case the number of sheets vary greatly between print jobs.

Percentages also may be used to determine estimates for consumable use for print jobs within the classification category. Estimation system 108 may break down the number of sheets, impressions, pages, and the like and use the percentages provided by distribution chart 510 to provide a consumable use estimate. For example, if a print job has 10,000 sheets of coated postcards, then distribution chart 510 can estimate that 40%, or 4000 sheets, will use between 0.046 to 0.055 pL of ink. The remaining values for consumable use per page may be used to determine the total consumable use estimate. This total consumable use estimate may be compared to total consumable use 416 from job costing data 401 to ensure the estimates are accurate.

Estimation system 108, using distribution analysis engine 424, can compare distribution chart 500 to distribution chart 510 to determine whether print job 103 was classified properly. In some embodiments, the operator may view the distribution charts to confirm the accuracy of the classification. In other embodiments, distribution analysis engine 424 compares the values in the distribution charts to determine whether a threshold amount is reached that shows too much variance between the charts. A high level of variance will mean print job 103 may not be classified properly. For example, if a comparison of distribution chart 500 to distribution chart 510 shows a variance in the ink use per page of more than 30%, then the operator may be notified.

After distribution chart 500 is confirmed as accurate, its plurality of values, or the values of job costing data 401, is added to consumable use information 420 to update distribution chart 510. The addition of distribution chart 500 to distribution chart 510 may cause some slight variance that will be reflected in future estimates for this classification category or to verify subsequent print jobs as being classified properly.

FIG. 5C depicts another distribution chart 520 for use in verifying distribution chart 500 for print job 103. Distribution chart 520 includes axis 522 for consumable use per page and axis 524 for the number of sheets assigned to the specific range of consumable use. The data shown by distribution chart 520 resembles that of distribution chart 510 but differs in how the consumable use is distributed amongst the consumable use ranges.

When compared to distribution chart 500, it may be seen that significant differences exist such that distribution chart 500 probably does not reflect the consumable use per page of the classification category for distribution chart 520. The disclosed embodiments would determine that distribution chart 500 and distribution chart 520 indicate that print job 103 was classified incorrectly. For example, 40 sheets of print jobs for distribution chart 520 use 0.036 to 0.045 pL of ink as compared to 5 sheets in distribution chart 500. No sheets use 0.056 to 0.065 pL of ink in distribution chart 520 as compared to 30 sheets in distribution chart 500 for print job 103. The disclosed embodiments would flag these distribution charts as having too much variance to be in the same classification category.

Figure 6A:
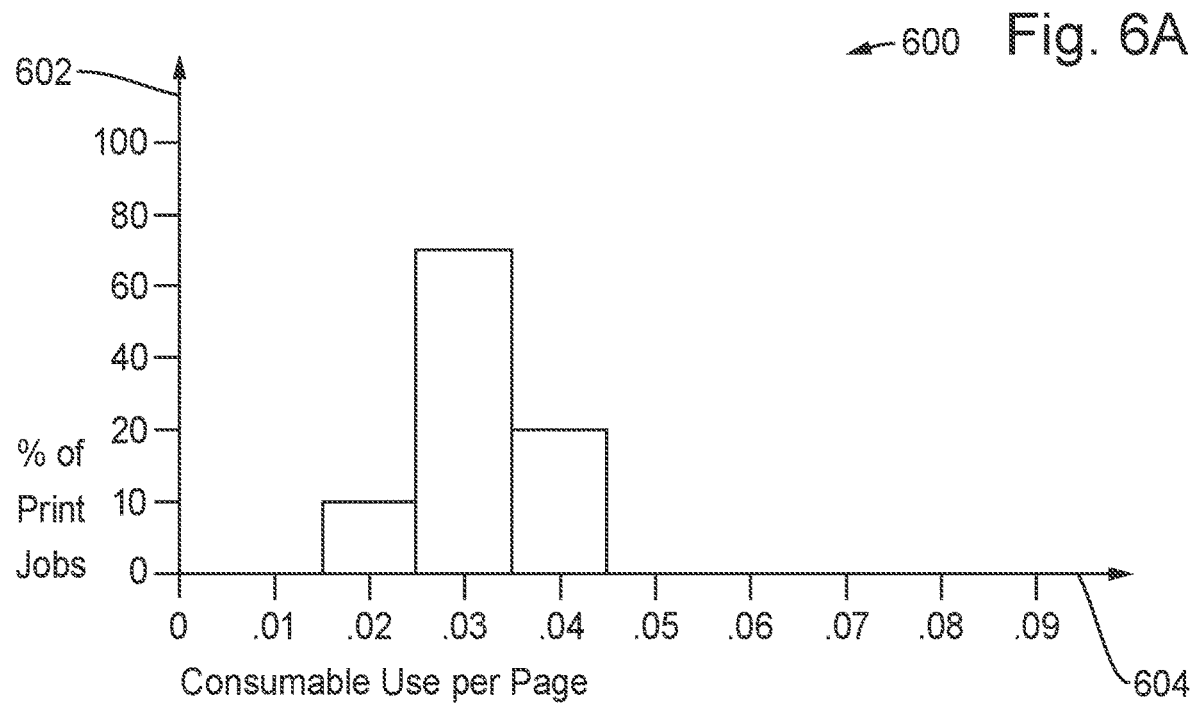
FIG. 6A illustrates a distribution chart for a distribution of the average consumable use per page for a classification category according to the disclosed embodiments.
Figure 6B:
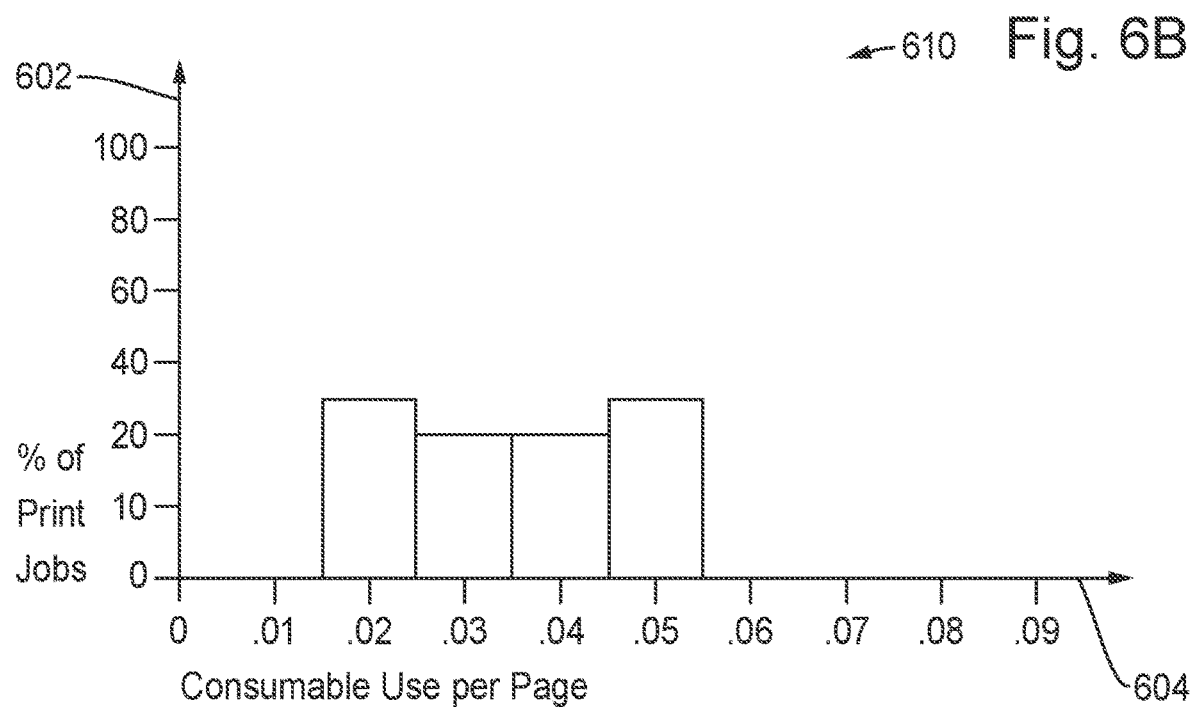
FIG. 6B illustrates another distribution chart for a distribution of the average consumable use per page for a classification category according to the disclosed embodiments.

FIGS. 6A and 6B depicts distribution charts 600 and 610 for distributions of the average consumable use per page for classification category 408 according to the disclosed embodiments. Distribution charts 600 and 610 show the percentage of print jobs having a designated average consumable use per page. Axis 602 shows the ranges for average consumable use, or ink use using the above examples, per page for a print job. An overall ink use per page may be determined using job costing data 401. This amount is assigned to a range on axis 604.

The total number of print jobs may reach into 100s or 1000s, so the percentages of these print jobs having the average consumable use per page range is shown, with the percentages from 0 to 100 shown by axis 602. In some embodiments, axis 602 may be the number of print jobs of a total number having the range on axis 604. Looking at the distribution over the ink use ranges, the disclosed embodiments may determine whether the classification category is accurate for consumable use estimation.

Referring to distribution chart 600, it may be seen that the distribution is tight with little overlap between the ranges. The range of 0.026 to 0.035 pL of ink applies to 70% of the print jobs for classification category 408. Estimates using these values will most likely be accurate. There is some variance in the ranges of 0.016 to 0.025 pL of ink and 0.036 to 0.045 pL of ink, but these are 20% or less of the total print jobs, respectively.

In contrast, distribution chart 610 shows a lot of overlap between ranges of consumable use. No range is above 30% of the print jobs for this classification category. Further, the percentages appear evenly distributed over a range between 0.016 to 0.055 pL of ink, which may be too loose to provide an accurate consumable use estimate. The disclosed embodiments may determine that the classification of print jobs for classification category 408 for distribution chart 610 may need to be broken down further or a problem may need to be addressed for print jobs within the associated classification category.

Estimation system 108 also may perform ongoing verification operations by adding job costing data for all jobs. Estimation system 108 may warn the print shop if the aggregate metrics for the classification drift by more than a set amount. Using the above example, if distribution chart 600 drifts to where any range is not above 50%, then the operator may be alerted.

FIG. 7 depicts a flowchart 700 for using classification-based consumable use data in printing operations according to the disclosed embodiments. Flowchart 700 may refer to FIGS. 1A to 6B for illustrative purposes. Flowchart 700, however, is not limited to the embodiments disclosed in FIGS. 1A to 6B.

Step 702 executes by defining plurality of classification categories 406 for print jobs analyzed by estimation system 108. As disclosed above, the different categories for print jobs may be further broken into classification categories based on job properties derived from job settings 126 for a print job. Preferably, there are several classification categories defined to provide distinctive data for each category.

Step 704 executes by receiving job costing data 401 for a completed print job 103. Step 704 also executes by providing arbitrary job category 402. Arbitrary job category 402 may be selected by the operator or customer before print job 103 is submitted. Referring to FIG. 1A, printing device 104 may print document 105. DFB 106 compiles the job costing data for performing the printing operations and reports this to estimation system 108. Step 706 executes by determining job property 404 for print job 103 based on job settings 126. In some embodiments, two or more job properties may be determined. Job property 404 is not provided by the operator or customer but determined from the print job itself.

Step 708 executes by assigning print job 103 to a classification category 408 from plurality of classification categories 406. The assignment is made based on arbitrary job category 402 and job property 404. Using the above examples, arbitrary job category 402 may be postcard as selected by the operator. Job settings 126 may set forth that the postcards are to be printed using coated paper having a specified paper size, and using color printing. All of these features may be analyzed to derive job properties 404 for print job 103. Classification category 408, therefore, includes arbitrary job category 402 plus all applicable job properties 404.

Step 710 executes by determining a consumable use value for each sheet within print job 103. For example, sheets 410 may be broken down to determine consumable use amounts 412. Sheet 1 of sheets 410 may use consumable use amount 1 for consumable amounts 412. Sheet 2 of sheets 410 may use consumable use amount 2, which differs from consumable use amount 1. Step 712 executes by determining a total consumable use 416 from sheets 410 and consumable use amounts 412.

Flowchart 700 then may proceed to step 714, which executes by aggregating total consumable use 416 along with average consumable use per page data with existing consumable use information 420. The new job costing data is added to the historical data. Flowchart 700 also may proceed to step 716. Step 716 executes by determining a metric from print job 103 based on total consumable use 416. The metric may be an average consumable use per page, a media consumable use per page, or a geometric mean consumable use per page.

Using the metric and job costing data 401, a distribution chart may be generated for the consumable use distribution for print job 103. Thus, step 718 executes by determining the number of quantiles for use within a distribution analysis. For example, if the metric is consumable use per page, then the range of consumable use may be determined and the applicable ranges defined as quantiles. Referring to distribution chart 500, 7 quantiles may be shown. Step 720 executes by creating distribution chart 500 using job costing data 401 and the defined quantiles, or the values for axis 502.

FIG. 8 depicts a flowchart 800 for performing classification-based consumable use estimation according to the disclosed embodiments. Flowchart 800 may refer to FIGS. 1A-7 for illustrative purposes. Flowchart 800, however, is not limited to the embodiments disclosed by FIGS. 1A-7.

The disclosed embodiments may estimate consumable use for a print job without doing rendered or other operations for the print job. Using estimation system 108, the disclosed embodiments may provide an estimate using the classification categories. As disclosed above, estimation system 108 may use historical job costing data to generate distribution charts for consumable use information 410 for a specific classification category 408. Print job 103 is submitted with job settings 126. Using the classification assignment disclosed in flowchart 700, the appropriate classification category may be selected and used to provide consumable use estimates.

An estimate to process and print document 105 for print job 103 includes an estimate for consumables 132, whether for ink 134 or toner 136. Consumable use may differ from other factors for an estimate, such as cost of a sheet, as it may depend on several factors within printing device 104. In known estimate processes, the print job is partially processed or rendered to determine the consumable use estimate, such as determining dot count value 309 in FIG. 3.

The disclosed embodiments, however, do not need to go through such operations, thereby freeing up DFB 106 and resources on printing device for printing operations. Instead, estimation system 108 may provide consumable use estimate using classification-based processes. Estimation system 108 may use job costing data compiled for print jobs assigned to a specific classification category to provide consumable use estimate.

Step 802 executes by receiving print job 103 at estimation system 108. The operator or customer may submit print job 103 to estimation system 108 for an estimate for printing document 105, including an estimate for the use consumables 132. Step 804 executes by selecting arbitrary job category 402 with print job 103. As disclosed above, the operator or customer may select arbitrary job category 402. The print shop may have a list of arbitrary job categories from which to select for print job 103.

Step 806 executes by determining job property 404 from job settings 126 for print job 103. Examples of job properties are disclosed above. More than one job property may be determined for print job 103. Preferably, the number of job properties determined corresponds to the number of job settings information used to create plurality of classification categories 406. Job property 404 relates to a feature about print job 103 and is not selected by the operator or the customer.

Step 808 executes by identifying classification category 408 from plurality of classification categories 406 using arbitrary job category 402 and job property 404. For example, the customer may select trade book at arbitrary job category 402 and job settings 126 may define a paper size as job property 404. Classification category 408, therefore, is one for trade books having the paper size. There may be four different paper sizes available for printing trade books such that classification category 408 only includes job costing data for those fitting the criteria for the classification category.

Step 809 executes by retrieving consumable use information 420 for classification category 408. Estimation system 108 may retrieve consumable use information 420, which includes the cumulative historical consumable use data for classification category 408. This data may be in the form of a distribution chart, such as distribution chart 510. Step 810 executes by applying print job 103 to job costing data for classification category 408. The disclosed embodiments apply a property of print job 103 to the consumable use information 420. For example, the property may be the total number of sheets for print job 103. Alternatively, the property may be the total number of impressions, segments, pages, and the like. Using the total number of sheets example, print job 103 is broken into sets of sheets that are applied to the consumable use per page ranges in the distribution chart. For example, referring to distribution chart 510, 40% of sheets are estimated to use 0.05 pL of ink, 30% of sheets are estimated to use 0.06 pL of ink, 10% of sheets are estimated to use 0.03 pL of ink, and 5% of sheets are estimated to use 0.02 pL of ink, 5% of sheets are estimated to use 0.04 pL of ink, 5% of sheets are estimated to use 0.07 pL of ink, and 5% of sheets are estimated to use 0.08 pL of ink.

Step 812 executes by generating a consumable use estimate from estimation system 108 based on consumable use information 420 for job costing data related to classification category 408. Estimation system 108 uses the estimated values determined above to determine how much ink that the total number of sheets uses. For a 10,000 sheet print job, 4000 sheets may be estimated to use 0.05 pL of ink, and so on. Over time, distribution chart 510 may change as job costing data causes variance in the distributions of consumable use per page. Subsequent print job estimates will account for any changes based on the distributions. For example, conditions at printing device 104 may change over time such that more ink is used for print jobs. The disclosed estimation process accounts for these changes. Estimation system 108 provides the consumable use estimate to the operator or customer.

FIG. 9 depicts a flowchart 900 for verifying a classification category 408 for a print job according to the disclosed embodiments. Flowchart 900 may refer to FIGS. 1A to 8 for illustrative purposes. Flowchart 900, however, is not limited to the embodiments disclosed for FIGS. 1A to 8.

Step 902 executes by performing steps 704-720 of flowchart 700. In other words, a consumable use value for each sheet is determined along with the total consumable use for print job 103. Job costing data 401 is provided as well. This information is used to generate a distribution chart for consumable use per sheet for print job, such as one shown by distribution chart 500. It should be noted that step 714 may not be performed for step 902 in that verification of classification category 408 should be done before aggregating the job costing data into the historical job costing information.

Step 904 executes by retrieving historical consumable use information, such as consumable use information 420, related to classification category 408 assigned to print job 103. As disclosed above, consumable use information represents the compiled historical data for consumable use per page for prints job related to classification category 408. Step 906 executes by generating a historical distribution chart for historical consumable use information 420. The historical distribution chart resembles the distribution chart for print job in that it also include consumable use per page information. An example of a historical distribution chart may be shown by distribution chart 510 or 520.

Step 908 executes by comparing the distribution chart for print job 103 to the historical distribution chart for historical consumable use information 420. For example, distribution chart 500 may be compared to distribution chart 510 or 520, whichever is more applicable. As one can appreciate, there most likely are differences between the two distribution charts. Thus, step 910 executes by determining the differences between the two charts. Differences may include variances between the consumable use per page numbers or percentages for each range in the charts. Referring to distribution charts 500 and 510, it may be appreciated that there are differences between the ranges for 0.016 to 0.025 pL of ink, 0.026 to 0.035 pL of ink, 0.046 to 0.055 pL of ink, and 0.076 to 0.085 pL of ink. The total amount of these differences may be compiled or compared to be 20%.

Step 912 executes by determining whether the differences between the two charts are over a set amount, or threshold, for classification category 408. For example, a threshold may be 35% in that differences greater than this amount indicates that print job 103 may have been misclassified. Differences below this amount indicate that print job is properly assigned to classification category 408. This feature prevents erroneous data from being aggregated to the historical consumable use information, which is used by estimation system 108 to provide consumable use estimates.

If step 912 is yes, then step 914 executes by verifying classification category 408 is properly assigned to print job 103. The job costing data received by estimation system 108 is aggregated into the historical consumable use information to update the information used for consumable use estimates. If step 912 is no, then step 916 executes by sending an alert that print job 103 may be improperly classified to classification category 408. The operator may review the job costing data and information to determine whether the reclassify print job 103 or to proceed with aggregating it with the historical consumable use information.

Figure 10:
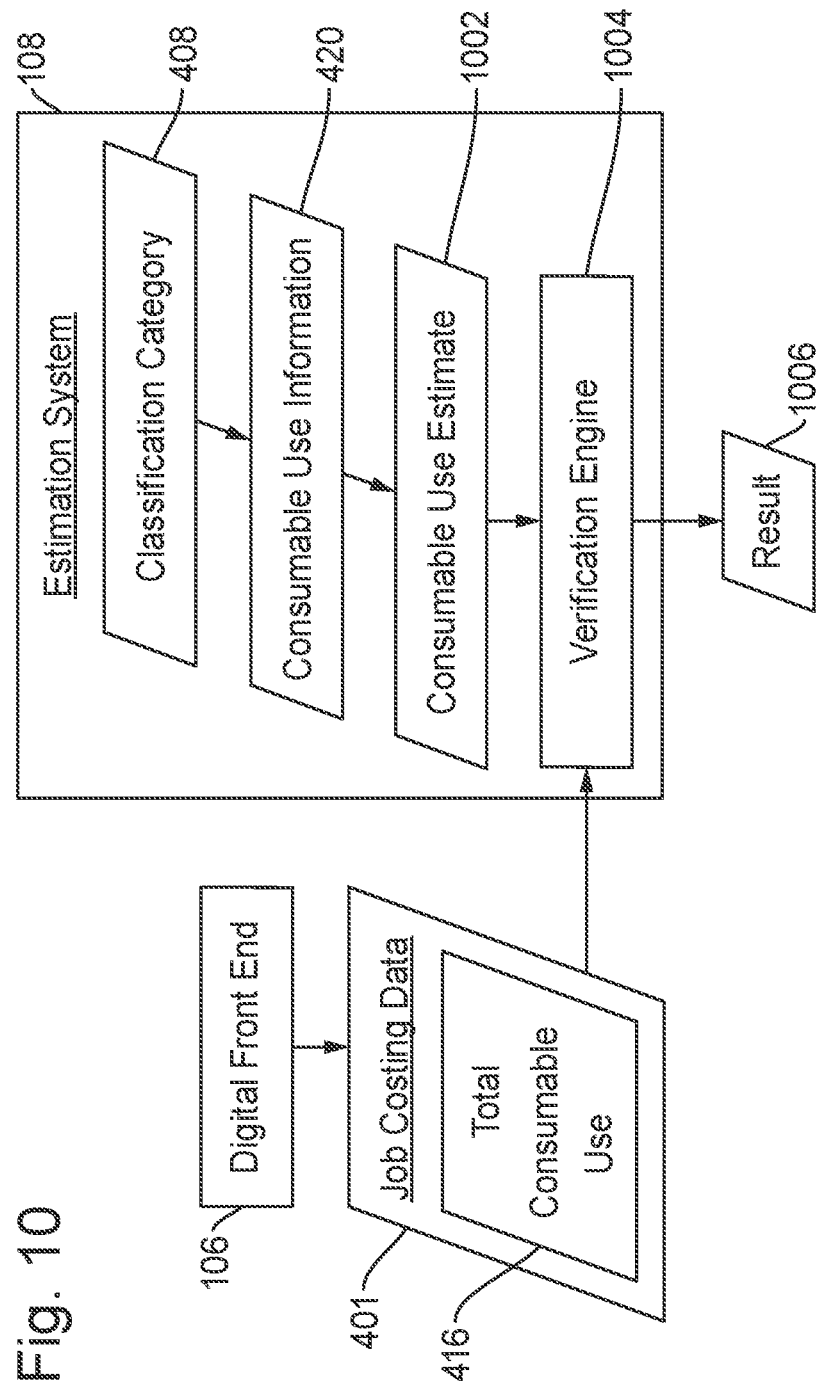
FIG. 10 illustrates a block diagram of the estimation system for verifying a consumable use estimate according to the disclosed embodiments.

FIG. 10 depicts a block diagram of estimation system 108 for verifying a consumable use estimate 1002 according to the disclosed embodiments. As disclosed above in flowchart 800, estimation system 108 may provide a consumable use estimate 1002 using consumable use information 420 for classification category 408. Estimation system 108 may verify consumable use estimate 1002 with the reported consumable use after printing document 105 for print job 103. The disclosed embodiments may use the verification to ensure that use of the classification categories is accurate. Further, the verification may be used to determine if something occurred that needs to checked. For example, if consumable use estimate 1002 is much too low for the reported consumable use, then the operator may want to check printing device 104 for a maintenance issue.

Classification category 408 is selected using arbitrary job category 402 and job property 404, as disclosed above. Estimation system 108 then retrieves consumable use information 420 to generate consumable use estimate 1002. Consumable use information 420 may be historical data or a distribution that is takes a property of print job 103, such as the number of sheets or impressions, and determines the likely consumable use. Consumable use estimate 1002 may be provided to the operator or customer for pricing purposes, or used by estimation system 108 to provide an overall total estimate for print job 103.

Print job 103 is processed at DFE 106 so that document 105 is printed at printing device 104. In completing the printing operations, DFE 106 compiles job costing data 401 including total consumable use 416. Total consumable use 416 may be the total amount of ink or toner used to print document 105. Job costing data 401 and total consumable use 416 is provided to estimation system 108. Estimation system 108 may use job costing data 401 to update consumable use information 420, as disclosed above.

Estimation system 108 also may use total consumable use 416 to verify that consumable use estimate 1002 was accurate. These items are provided to verification engine 1004 of estimation system 108. Verification engine 1004 compares total consumable use 416 to consumable use estimate 1002. If the results for these items vary by a certain amount, such as 20%, then an error may have occurred. An alert may be sent to the operator that print job 103 may have been misclassified. Otherwise, printing device 104 may have a maintenance problem that results in using an increased amount of ink or toner. Verification engine 1004 may send result 1006 of the verification to the operator.

FIG. 11 depicts a flowchart 1100 for verifying consumable use estimate 1002 for print job 103 using estimation system 108 according to the disclosed embodiments. Flowchart 1100 may refer to FIGS. 1A to 10 for illustrative purposes. Flowchart 1100, however, is not limited to the embodiments disclosed by FIGS. 1A to 10.

Step 1102 executes by generating consumable use estimate 1002, as disclosed by step 812 above. Flowchart 800 may be executed to determine consumable use estimate 1002 for print job 103. Step 1104 executes by printing document 105 at printing device 104. Document 105 is the printed version of print job 103. Step 1106 executes by generating job costing data 401 for printing document 105. Job costing data 401 includes total consumable use 416. Step 1108 executes by providing total consumable use 416 along with job costing data 401 to estimation system 108. Alternatively, estimation system 108 may receive job costing data 401 to determine total consumable use 416 therein.

Step 1110 executes by comparing consumable use estimate 1002 to total consumable use 416 for print job 103. The disclosed embodiments compare the estimated values for consumable use with the actual values incurred at printing device 104. As can be appreciated, it would be advisable to determine if any differences exist between these values. The difference between these values is determined. For example, if consumable use estimate 1002 is 100 pL of ink, then it is compared to a total consumable use 416 of 125 pL of ink. Estimation system 108 determines that there is a difference of 25 pL of ink.

Step 1112 determines whether any difference between consumable use estimate 1002 and total consumable use 416 is acceptable. A difference amount may be set, such as 20%, that indicates that the consumable use estimate was not acceptable. A 20% variance may indicate that something is not right with the estimation process. Alternatively, an amount of consumable, such as ink or toner, may be set as a threshold for verifying consumable use estimate 1002. For example, using the comparison above, a set amount of 20% would indicate that total ink use was above this amount and that the estimate is not verified. A threshold of 30 pL of ink, however, would be acceptable. Verification engine 1004 may perform the comparison at estimation system 108.

If step 1112 is yes, then consumable use estimate 1002 is verified and step 1114 executes by sending result 1006 of the comparison to the operator. Further, step 1116 executes by aggregating job costing data 401 with total consumable use 416, as disclosed above in flowchart 700. Consumable use information 420 for classification category 408 is updated with the results of printing document 105.

If step 1112 is no, then step 1118 executes by sending an alert as result 1006 to the operator that consumable use estimate 1002 is not verified. The operator may be alerted that a problem occurred in generating the estimate. Maintenance or trouble shooting operations, such as calibration, may be performed on printing device 104. Step 1120 may execute by performing classification verification. In other words, the operator may generate a distribution chart, like distribution charts 600 and 610, to determine whether print jobs for classification category 408 are distributed in a tight manner. If not, then further actions may need to be taken to update the classification estimation process.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for classification-based consumable use estimation, the method comprising:
    receiving a print job at an estimation system, wherein the estimation system provides a consumable use estimate for the print job,
    wherein the print job includes at least one job setting;
    identifying a classification category from a plurality of classification categories for the print job based on an arbitrary job category and a job property defined from the at least one job setting, wherein the arbitrary job category is selected by an operator input;
    retrieving consumable use information for the classification category, wherein the consumable use information includes a distribution chart of consumable use amounts; and
    estimating the consumable use estimate for the print job by applying a property for the print job to the consumable use information.

2. The method of claim 1, wherein the consumable use estimate is an ink use estimate.

3. The method of claim 1, wherein the consumable use estimate is a toner use estimate.

4. The method of claim 1, wherein retrieving the consumable use information includes retrieving a distribution for consumable use per page.

5. The method of claim 1, wherein the property for the print job includes a total number of pages.

6. The method of claim 1, wherein the job property is a paper type, a paper color, or a paper size.

7. The method of claim 1, wherein the job property is color printing or monochrome printing.

8. The method of claim 1, further comprising receiving the at least one job settings to the estimation system from a digital front end (DFE) of a printing device.

9. The method of claim 1, further comprising receiving job costing data for the print job after printing operations at a printing device connected to the estimation system.

10. A method for verifying a consumable use estimate for a print job, the method comprising:
    receiving a print job at an estimation system, wherein the estimation system provides a consumable use estimate for the print job, wherein the print job includes at least one job setting;

identifying a classification category from a plurality of classification categories for the print job based on an arbitrary job category and a job property defined from the at least one job setting, wherein the arbitrary job category is selected by an operator input;

estimating the consumable use estimate based on the classification category;

printing a document for the print job;

generating job costing data for printing the document, wherein the job costing data includes a consumable use; and verifying the consumable use estimate according to the consumable use at the estimation system.

11. The method of claim 10, wherein the consumable use estimate includes an ink use estimate.

12. The method of claim 10, wherein the consumable use estimate includes a toner use estimate.

13. The method of claim 10, further comprising receiving the at least one job settings to the estimation system from a digital front end (DFE) of a printing device.

14. The method of claim 10, further comprising retrieving consumable use information for the classification category.

15. The method of claim 14, wherein estimating the consumable use estimate includes estimating the consumable use estimate for the print job by applying a property for the print job to the consumable use information.

16. An estimation system for a printing system, the estimation system including a processor and a memory, wherein the memory includes instructions to configure the processor to receive a print job at the estimation system, wherein the estimation system provides a consumable use estimate for the print job, wherein the print job includes at least one job setting;

identify a classification category from a plurality of classification categories for the print job based on an arbitrary job category and a job property defined from the at least one job setting, wherein the arbitrary job category is selected by an operator input;

retrieve consumable use information for the classification category, wherein the consumable use information includes a distribution chart of consumable use amounts; and estimate the consumable use estimate for the print job by applying a property for the print job to the consumable use information.

17. The estimation system of claim 16, wherein the processor is further configured to receive the at least one job settings to the estimation system from a digital front end (DFE) of a printing device.

18. The estimation system of claim 16, wherein the processor is further configured to retrieve the consumable use information, which includes retrieving a distribution for consumable use per page.

19. The estimation system of claim 16, wherein the consumable use estimate includes an ink use estimate.

20. The estimation system of claim 16, wherein the consumable use estimate includes a toner use estimate.

* * * * *